April 13, 1926.

W. T. LA CROSS ET AL 1,580,306

LAWN TRIMMER

Filed March 14, 1925

Inventors
William T. LaCross
Fred W. Barber
by [signature]
Attys.

Patented Apr. 13, 1926.

1,580,306

UNITED STATES PATENT OFFICE.

WILLIAM T. LA CROSS AND FRED W. BARBER, OF SPRINGFIELD, VERMONT.

LAWN TRIMMER.

Application filed March 14, 1925. Serial No. 15,424.

*To all whom it may concern:*

Be it known that we, WILLIAM T. LA CROSS and FRED W. BARBER, citizens of the United States, residing at Springfield, in the county of Windsor and State of Vermont, have invented new and useful Improvements in Lawn Trimmers, of which the following is a specification.

This invention relates to lawn trimmers adapted to trim grass close to obstructions, such as walls, fences, curbs, posts, etc., the grass being inaccessible to lawn mowers designed to trim in open or unobstructed spaces.

One object of the invention is to provide a lawn trimmer comprising a push-bar, a cutting element which includes a notched cutter fixed to the push-bar, and a notched reciprocating cutter slidably connected with the fixed cutter, and improved mechanism of simple and effective construction, carried by the push-bar and manually operable to reciprocate the movable cutter.

Another object is to permit the cutting element to be adjusted to and positively secured in various angular positions relative to the push-bar, the cutting element being operative in either of said positions.

Of the accompanying drawings forming a part of this specification—

The same reference characters indicate the same parts in all of the figures.

12 designates a push-bar, which may be of wood and of any desired length. Secured to one end of the push-bar, as hereinafter described, is a cutting element including a fixed notched cutter 13 and a movable notched cutter 14, slidably connected with the fixed cutter by bolts 15, secured to the fixed cutter and passing through slots 16 in the movable cutter.

Figure 1:
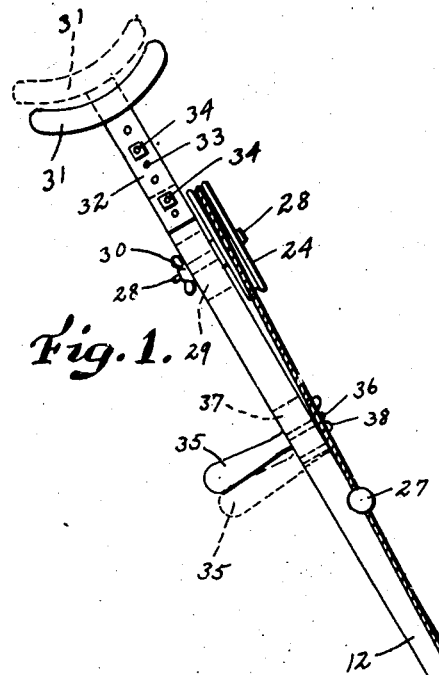
Figure 1 is a side view of a lawn trimmer embodying the invention.

The arrangement is such that the push-bar is inclined and the cutting element is attached at the lower end of the push-bar and extends horizontally therefrom, as shown by Figure 1, when the mower is in operation.

The push-bar carries improved manually controlled operating mechanism for reciprocating the movable cutter 14. Said mechanism includes a crank-shaft 18, journaled in bearings in a bracket 19, and provided with a crank 20 (Figure 1), a pitman 21, connecting the crank with a post 22, fixed to the movable cutter, a lower pulley 23, fixed to the crank-shaft, an upper pulley 24, mounted on the upper end portion of the push-bar, lower guiding pulleys 25, mounted on the lower portion of the push-bar, and a manually movable flexible band or belt 26, running on said pulleys 23, 24 and 25.

The band, which may be of any suitable flexible material, such as wire cable, is adapted to be moved alternately in opposite directions by the operator, and thus cause rotation of the crank-shaft 18, and reciprocation of the movable cutter. The band is preferably provided with a hand grip 27, adapted to be grasped by the operator.

The upper pulley 24 is adjustable lengthwise of the push-bar, to tension the band 26, and is provided with means whereby it may be confined at any desired adjustment. In this instance, the pulley 24 is rotatable on a stud 28, passing through, and slidable in, a slot 29 (Figure 1), in the push-bar, and provided with a clamping wing nut 30, adapted to be set up to secure the stud and the pulley in any position to which they are adjustable.

31 designates a shoulder rest, adapted to bear on the under side of the operator's arm at its junction with the body, to transmit pushing force to the push-bar. The rest 31 is movably mounted on the upper end of the push-bar and is provided with means whereby it may be secured in different positions as indicated by full and dotted lines in Figur 1, according to the height of the operator, said means preferably including ears 32, fixed to the rest and each provided with a series of bolt holes 33, any two of which may receive bolts 34, engaged with the push-bar.

A handle 35 (Figure 1) projecting laterally from the push-bar, is adjustably secured thereto, so that it may be located at different distances from the rest 31, as indicated by full and dotted lines in Figure 1, and thus suited to the requirements of the operator.

As here shown, the handle is provided with a shank 36, extending through a longitudinal slot 37 in the push-bar and provided with a clamping wing nut 38, adapted to be set up against the push-bar.

Figure 3:
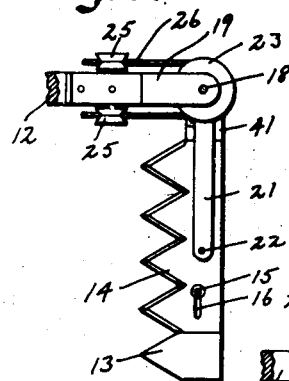
Figures 3 and 4 are fragmentary views, similar to portions of Figure 2, showing different adjustments of the cutting element.
Figure 4:
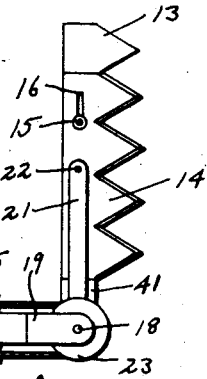
Figure 2:
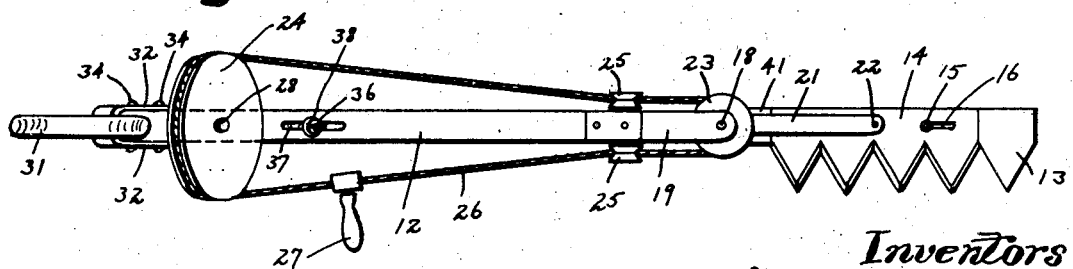
Figure 2 is a top plan view of the same.

The cutting element is connected with the push-bar by means permitting said element to occupy either of the positions relative to the push-bar shown by Figures 2, 3 and 4, the cutting element being operative in either position.

Figure 6:
Figure 6 is a fragmentary plan view, showing by itself, a portion of the carrying-arm shown by Figure 5.
Figure 5:
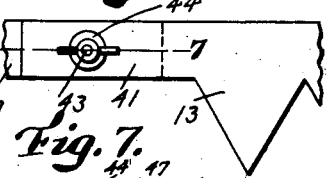
Figure 5 is a fragmentary plan view, on a larger scale, showing a portion of the fixed cutter and a portion of the carrying-arm to which the cutter is pivoted.

Said means includes a carrying-arm 39, fixed to, and projecting horizontally forward from the lower end of the push-bar, and provided with an orifice 40 (Figure 6), a shank 41, formed on, and projecting from the inner end of the fixed cutter 13, and provided with an orifice 42 (Figure 7), and a clamping bolt 43 inserted in said orifices, and provided with a clamping wing nut 44, adapted to be set up against the shank 41.

The bolt 43 is in axial alinement with the crank-shaft 18, so that the cutting element may be swung on the bolt to either of the positions shown, when the nut 44 is loosened, without affecting the operativeness of the cutting element.

Figure 7:
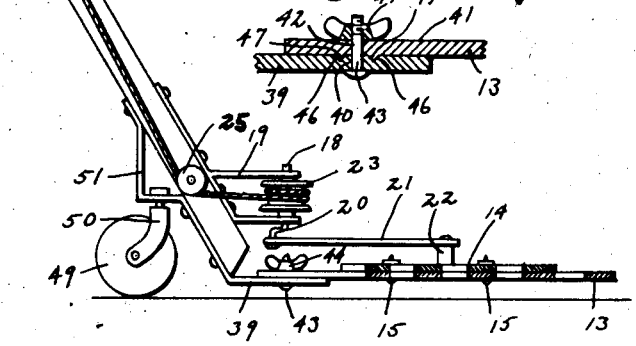
Figure 7 is a section on line 7—7 of Figure 5.

The carrying-arm 39 is provided with a circular series of sockets 46 (Figure 6), and the shank 41 is provided with two bosses 47, adapted to engage two of said sockets, as shown by Figure 7, the arrangement of the sockets and bosses being such that when the cutting element is in either of the positions shown, the bosses 47 are in engagement with two of the sockets 46, the engagement being maintained by tightening the nut 44, so that the cutting element is positively locked, and prevented from swinging on the bolt.

49 designates a supporting wheel, journaled in a yoke 50, which is supported by a bracket 51, fixed to the lower end portion of the push-bar, the wheel being arranged to support the cutting element above the ground, as shown by Figure 1.

The supporting wheel projects rearwardly and the carrying-arm 39 projects forwardly from the push-bar. The crank shaft 18 may be driven by any suitable means controlled by the operator.

With the adjustment of the cutting element shown by Figure 2, grass can be trimmed under low-hanging shrubbery more advantageously than with the adjustment shown by Figures 3 and 4. With the adjustment shown by Figure 3, the operator can cut behind obstacles such as shrubbery, posts, etc., by moving the trimmer backward, the obstacle being between the cutting element and the operator.

With the adjustment shown by Figure 4, the operator can trim close to a wall by moving the trimmer forward toward the wall.

We claim:

1. A lawn mower comprising an inclined push-bar, a supporting wheel connected with the lower end of the push-bar and projecting rearwardly therefrom, a forwardly projecting carrying arm fixed to the lower end of the push-bar and supported above the ground by the wheel, forwardly projecting bearings on the push-bar above the carrying-arm, a cutting element composed of a fixed cutter and a movable cutter, the fixed cutter having a shank at its inner end, a clamping bolt pivotally connecting the shank with the carrying arm, arranged to permit horizontal adjustment of the cutting element, means being provided for positively securing the element to the carrying arm in different positions relative thereto, and mechanism for reciprocating the movable cutter including a crank-shaft journalled in said bearings on the push-bar, a pitman connecting the crank of said shaft with the movable cutter, and manually operable means carried by the push-bar for rotating the crank shaft, the bolt and the crank shaft being in alinement with each other, so that the said mechanism is operative when the cutting element is in any position to which it may be adjusted.

2. A lawn mower comprising an inclined push-bar, a supporting wheel connected with the lower end of the push-bar and projecting rearwardly therefrom, a forwardly projecting carrying arm fixed to the lower end of the push-bar and supported above the ground by the wheel, forwardly projecting bearings on the push-bar above the carrying arm, a cutting element composed of a fixed cutter and a movable cutter, the fixed cutter having a shank at its inner end, a clamping bolt pivotally connecting the shank with the carrying arm, and arranged to permit horizontal adjustment of the cutting element, means being provided for positively securing the element to the carrying arm in different positions relative thereto, a crank shaft journaled in said bearings on the push-bar, and provided with a pulley, a pitman connecting the crank of said shaft with the movable cutter, an upper pulley mounted on the upper portion of the push-bar, guiding pulleys mounted on the lower end portion of the push-bar and a band running on said pulleys and having a handle whereby it may be manually moved to rotate the crank shaft, said upper pulley being adjustable lengthwise of the push-bar to tension the band.

3. A lawn mower comprising an inclined push-bar, a supporting wheel connected with the lower end of the push-bar and projecting rearwardly therefrom, a forwardly projecting carrying arm fixed to the lower end of the push-bar and supported above the ground by the wheel, forwardly projecting bearings on the push-bar above the carrying arm, a cutting element composed of a fixed cutter and a movable cutter, the fixed cutter having a shank at its inner end, a clamping bolt pivotally connecting the shank with the carrying arm, and arranged to permit horizontal adjustment of the cutting element, said bolt being provided with means for exerting clamping pressure on the carrying arm and shank, and the said carrying arm and shank being provided with projections and depressions which are interlocked by said clamping pressure, and mechanism for reciprocating the movable cutter including a crank shaft journaled in said bearings on the push-bar, a pitman connecting the crank of said shaft with the movable cutter, and manually operable means carried by the push-bar for rotating the crank shaft, the bolt and the crank shaft being in alinement with each other, so that the said mechanism is operative when the cutting element is in any position to which it may be adjusted.

In testimony whereof we have affixed our signatures.

WILLIAM T. LA CROSS.
FRED W. BARBER.